United States Patent

Ko et al.

(10) Patent No.: US 7,933,241 B2
(45) Date of Patent: Apr. 26, 2011

(54) COMMUNICATION METHOD FOR USING BANDWIDTH EFFICIENTLY IN INTERNET PROTOCOL VERSION 6

(75) Inventors: Nam Seok Ko, Daejeon (KR); Sung Back Hong, Daejeon (KR); Kyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 860 days.

(21) Appl. No.: 11/975,188

(22) Filed: Oct. 17, 2007

(65) Prior Publication Data

US 2008/0137629 A1    Jun. 12, 2008

(30) Foreign Application Priority Data

Dec. 8, 2006   (KR) ......................... 10-2006-0125104

(51) Int. Cl.
*H04W 4/00*    (2009.01)

(52) U.S. Cl. ........................................ 370/328; 455/432
(58) Field of Classification Search .................. None
See application file for complete search history.

(56) References Cited

U.S. PATENT DOCUMENTS

| 7,454,187 B2 * | 11/2008 | Takahashi et al. ............ 455/328 |
| 7,554,949 B2 * | 6/2009 | Chen .............................. 370/331 |
| 2005/0144303 A1 | 6/2005 | Zhang et al. |
| 2006/0029020 A1 | 2/2006 | Jung et al. |

* cited by examiner

*Primary Examiner* — Anh-Vu Ly
(74) *Attorney, Agent, or Firm* — Blakely, Sokoloff, Taylor & Zafman LLP (57) ABSTRACT

A communication method for using bandwidth efficiently in Internet protocol version 6 (IPv6) is provided to minimize use of header information that is added when the terminal is moved. According to the present invention, while maintaining compatibility between general terminals that conform to the mobile IPv6, bandwidth can be more efficiently used for terminals supporting functions defined in the present invention.

15 Claims, 8 Drawing Sheets

BINDING CACHE TABLE

| HOME ADDRESS ; HoA | CARE-OF ADDRESS ; CoA | SEQUENCE NO. | LIFETIME | FLAGS |
|---|---|---|---|---|
| 3ffe:200:7:1:A:B:C:D | 3ffe:200:1:3:A:B:C:D | 11 | 250 | A/H/K/L/R |
| 3ffe:300:1:5:D:E:F:0 | 3ffe:700:2:5:D:E:F:0 | 2000 | 400 | A/H/L |
| ... | ... | ... | ... | ... |

BINDING CACHE TABLE

| HOME ADDRESS ; HoA | CARE-OF ADDRESS ; CoA | SEQUENCE NO. | LIFETIME | FLAGS |
|---|---|---|---|---|
| 3ffe:200:7:1:A:B:C:D | 3ffe:200:1:3:A:B:C:D | 11 | 250 | A/H/K/L/R |
| 3ffe:300:1:5:D:E:F:0 | 3ffe:700:2:5:D:E:F:0 | 2000 | 400 | A/H/L |
| 3ffe:500:4:1:A:B:C:D | 3ffe:500:4:1:A:B:C:D | 11 | 250 | A/H/K/L/R |
| ... | ... | ... | ... | ... |

COMMUNICATION METHOD FOR USING BANDWIDTH EFFICIENTLY IN INTERNET PROTOCOL VERSION 6

CROSS-REFERENCE TO RELATED PATENT APPLICATION

This application claims the benefit of Korean Patent Application No. 10-2006-0125104, filed on Dec. 8, 2006, in the Korean Intellectual Property Office, the disclosure of which is incorporated herein in its entirety by reference.

BACKGROUND OF THE INVENTION

1. Field of the Invention

The present invention relates to a communication method for using bandwidth efficiently in Internet Protocol version 6 (IPv6), and more particularly, to a header of IPv6.

This work was supported by the IT R&D program of MIC/ETRI [2006-S-061-01, R&D on Router Technology for IPv6 based on QoS Services and Host Mobility].

2. Description of the Related Art

Figure 1:
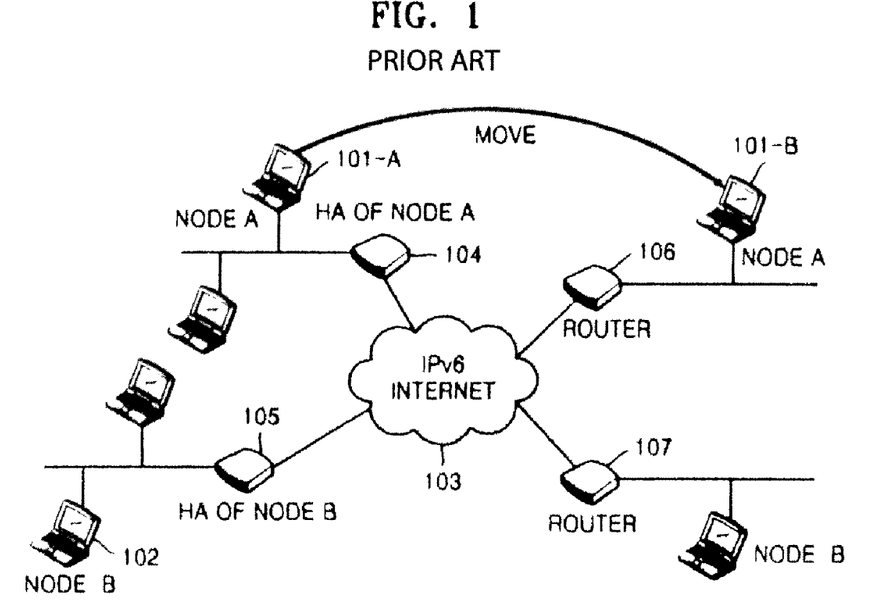
FIG. 1 is a conceptual diagram of a network environment in which one mobile terminal and one fixed terminal communicate.

FIG. 1 is a conceptual diagram of a network environment in which one mobile terminal and one fixed terminal communicate.

Referring to FIG. 1, a terminal A and a terminal B communicate with each other. In FIG. 1, the terminal A is moved from 101-A position to 101-B position and is referred to as a mobile node (MN). The terminal B 102 is referred to as a correspondent node (CN). In this case, the CN 102 is in an immovable state, and is a fixed terminal or a currently immovable terminal even though it can move.

Figure 2:
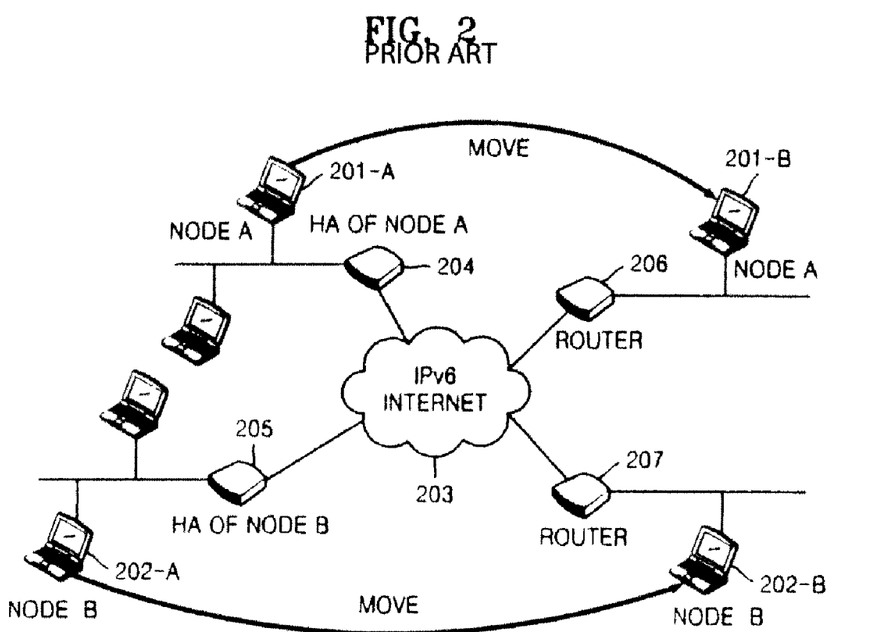
FIG. 2 is a conceptual diagram of a network environment in which two different mobile terminals communicate.

FIG. 2 is a conceptual diagram of a network environment in which two different mobile terminals communicate.

Referring to FIG. 2, the terminal A is moved from 201-A to 201-B and the terminal B is also moved from 202-A position to 202-B position. In terminal A's point of view, the terminal A itself is a MN and the terminal B is a CN. However, in terminal B's point of view, the terminal B itself is an MN and the terminal A is a CN. Therefore, in this case, the terminals A and B have both functions of MN and CN.

In a terminal, dividing a terminal into an MN and a CN is conceptual, and a terminal can be used as one node among two nodes, an MN and a CN. However, a terminal which can be used as two nodes at the same time may exist. A general mobile terminal can be designed to be used as two nodes at the same time.

In RFC 3775, which is a base specification for Mobile IPv6 and is used conventionally for supporting mobility in IPv6, even after a route optimization process between a MN and a CN is performed, a home address option of a 24 byte destination option header is additionally used for information on a home address that corresponds to an IP address of each terminal in a packet transmitted from a mobile terminal to a correspondent terminal. Also, in a packet transmitted from a correspondent terminal to a mobile terminal, a type 2 24 byte routing header is additionally used.

Therefore, if a correspondent terminal is a movable terminal, both the home address option of a destination option header and the type 2 routing header are needed for communicating between the mobile terminal and the correspondent terminal and thus a 48 byte additional header is used.

Figure 3:
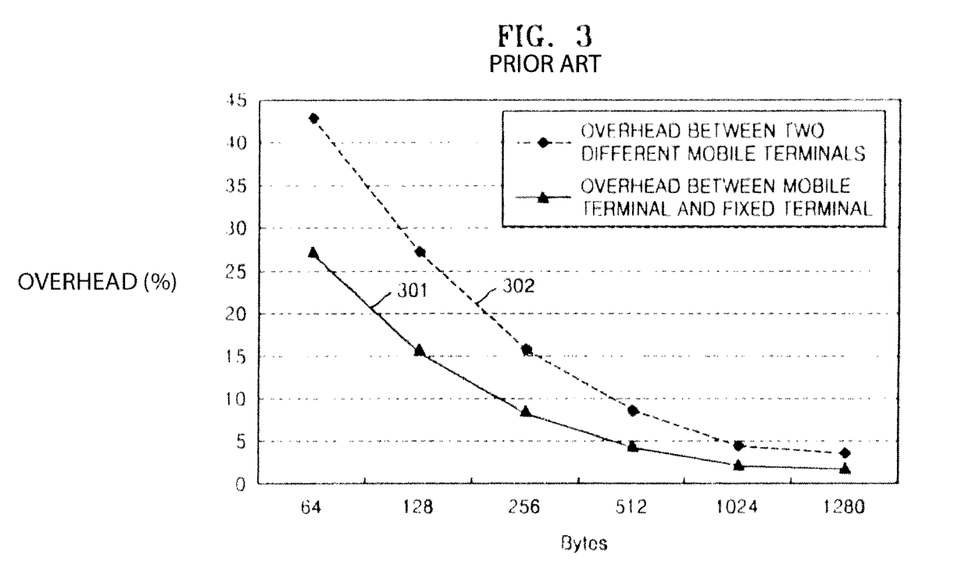
FIG. 3 is a graph illustrating overheads being generated between terminals with reference to various packet sizes, when a general mobility method of Internet Protocol version 6 (IPv6) is used in the environment as depicted in FIGS. 1 and 2.

FIG. 3 is a graph illustrating overheads being generated between terminals with reference to various packet sizes, when a general mobility method of IPv6 is used in the environment as depicted in FIGS. 1 and 2.

Referring to FIG. 3, 301 is referred to as an overhead being generated during packet exchanging between a fixed terminal and a mobile terminal and 302 is referred to as an overhead being generated during packet exchanging between two different mobile terminals.

Such an additional header functions as an overhead in a wired/wireless section. In particular, problems in performance may occur in a wireless section having lower bandwidth.

SUMMARY OF THE INVENTION

The present invention provides a communication method for using bandwidth efficiently in Internet Protocol version 6 (IPv6) which can replace a care-of address of each terminal with a home address without using an additional header by defining fields that are not used in a message defined in existing RFC 3775 which is a base specification for Mobile IPv6.

According to an aspect of the present invention, there is provided a communication method for using bandwidth efficiently in Internet Protocol version 6 (IPv6), the method including: (a) when a mobile node transmits a packet to a correspondent node, sending a binding update message to the correspondent node, the binding update message showing whether a home address option of a destination option header is omitted; (b) when the correspondent node that receives the binding update message receives a packet, in which the home address option is omitted, from the mobile node, sending a binding acknowledge message to the mobile node, the binding acknowledge message showing whether a source address of an IPv6 basic header of the packet can be restored as home address of the mobile node; (c) changing a source address of a packet that is to be sent by the mobile node into a care-of-address of the mobile node and sending the care-of-address to the correspondent node; and (d) the correspondent node which receives the packet restoring the source address of the packet as the home address of the mobile node.

According to another aspect of the present invention, there is provided a communication method for using bandwidth efficiently in Internet Protocol version 6 (IPv6), the method including: (a) when a mobile node receives a packet in which a type 2 routing header is omitted from a correspondent node, sending a binding update message to the correspondent node, the binding update message showing whether a destination address of an IPv6 basic header of the packet can be restored as a home address of the mobile node; (b) the correspondent node which receives the binding update message sending a binding acknowledge message to the mobile node, the binding acknowledge message showing whether the routing header type 2 is omitted when the correspondent node sends the packet to the mobile node; (c) changing the destination address of a packet to be sent by the correspondent node into a care-of-address of the mobile node and sending the care-of-address to the mobile node; and (d) the mobile node which receives the packet restoring the destination address of the packet as the home address of the mobile node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 4:
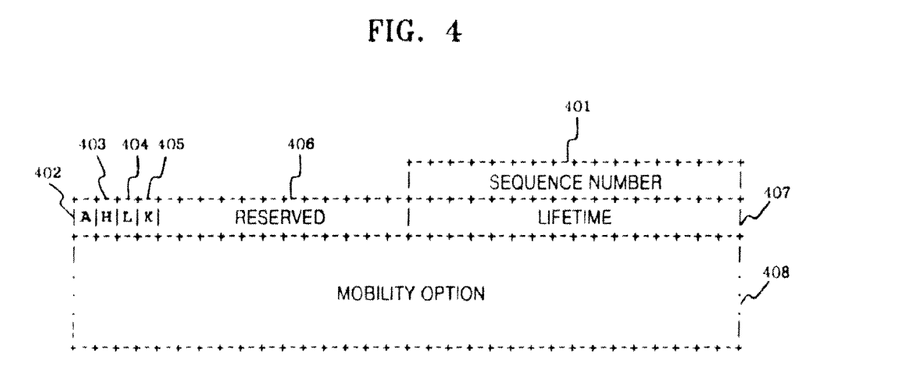
FIG. 4 is a diagram illustrating a binding update message defined in RFC 3775 which is a base specification for Mobile IPv6.

FIG. 4 is a diagram illustrating a binding update message defined in RFC 3775 which is a base specification for Mobile IPv6.

Referring to FIG. 4, the binding update message is sent from a mobile node (MN) to a correspondent node (CN), and a mobility header (MH) type is 5. A sequence number field 401 is used to identify an order of the binding update message in the receiving node and to match the binding update message with a binding acknowledge message in the sending node.

An acknowledge (A) field 402 identifies whether an acknowledgement of the binding update message should be received or not from the CN by the MN. Accordingly, when the CN receives a binding update message, the A field of which is set to 1, the CN sends a binding acknowledge message.

A home registration (H) field 403 shows that such a binding update message is being sent to a home agent (HA).

A link-local address compatibility (L) field 404 shows that an interface ID of a home address in the MN is identical with an interface ID of a link-local address in the MN.

A key management mobility capability (K) field 405 is used to identify whether security association between the MN and the HA should be accomplished each time the MN moves. When the K field is set to 0 and security association is accomplished once, security association is not needed after the MN moves. When the K field is set to 1, security association should be accomplished every time the MN moves.

A reserved field 406 is a field that remains behind for later definition.

A lifetime field 407 displays the length of time that binding information can be maintained. In order to delete binding information, the time is set to 0. Here, the time displayed is a unit time showing 4 seconds per unit, instead of real time.

A mobility option 408 may include a Binding Authorization option, a Nonce Index option, and an Alternate Care-of Address option. If there is no option that is going to be substantially used, 4 bytes of padding is needed, and a header length field is set to 1.

Figure 5:
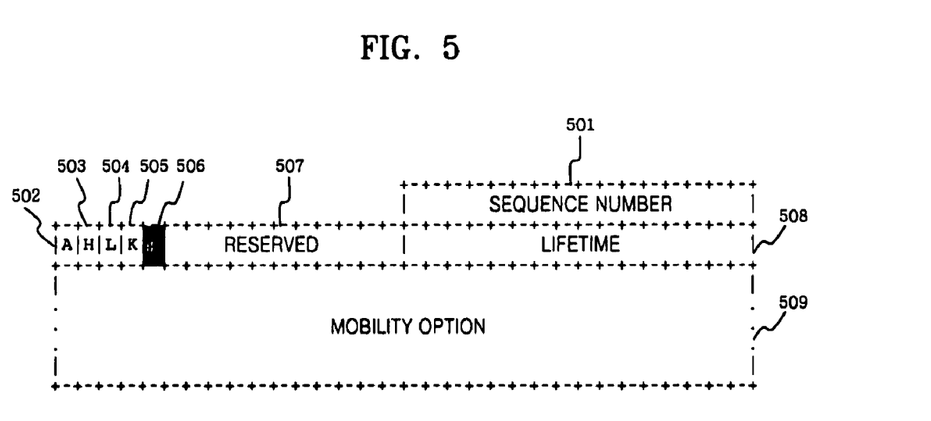
FIG. 5 is a diagram illustrating a binding update message in which an R field is added according to an embodiment of the present invention.

FIG. 5 is a diagram illustrating a binding update message in which an R field is added according to an embodiment of the present invention.

Referring to FIG. 5, each field which has the same field name as in FIG. 4 performs the same function as defined in FIG. 4. Here, the MN has its own address restoration capability, and a restoration capability (R) field 506 is newly defined to identify whether the CN has an address restoration capability. The R field is a kind of flag.

When the R field 506 is set to 1, the MN has its own address restoration capability and asks the CN if the CN has an address restoration capability. If the CN receives a binding update message, a binding cache entry is added. If the A flag 502 is set in the binding update message, the CN sends a binding acknowledge message to the MN. In this case, the R flag is set, and the CN identifies its own address restoration capability to display the R flag of the binding acknowledge message.

Figure 6:
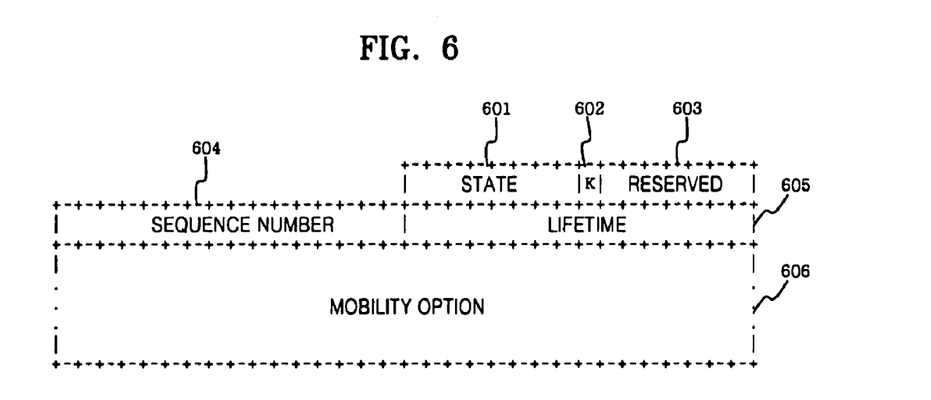
FIG. 6 is a diagram illustrating a binding acknowledge message defined in RFC 3775.

FIG. 6 is a diagram illustrating a binding acknowledge message defined in RFC 3775.

Referring to FIG. 6, the binding acknowledge message is a message sent by the CN in response to the binding update message received from the MN, and a mobility header (MH) type is 6.

A key management mobility capability (K) field 602 performs the same function as that of a K flag 505 in the binding update message. That is, when the K field 602 is set to 0, and security association is accomplished once, security association is not needed after the MN moves. When the K field is set to 1, security association should be accomplished every time the MN moves.

A sequence number field 604 and a lifetime field 605 perform the same functions as these of the fields having the same names in the binding update message.

A mobility option 606 may include a Binding Authorization option and a Binding Refresh Advice option. Such options are the same as defined in RFC3775. In addition, if there is no option that is going to be substantially used as in the case of the binding update message, 4 bytes of padding are needed, and a header length field is set to 1.

Figure 7:
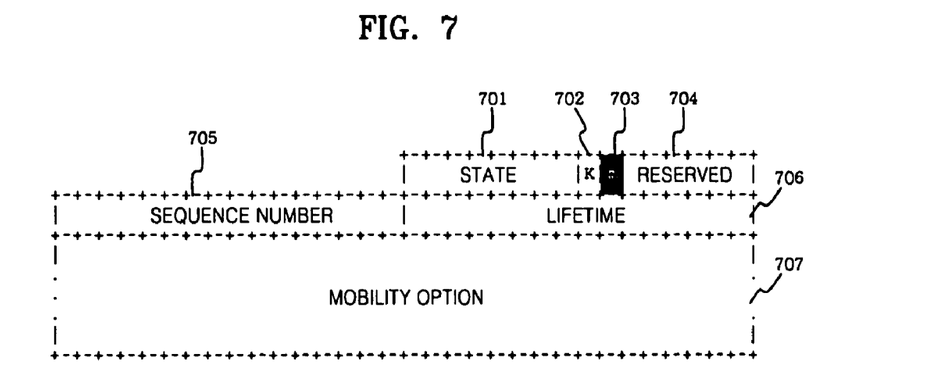
FIG. 7 is a diagram illustrating a binding acknowledge message in which an R field is added according to an embodiment of the present invention.

FIG. 7 is a diagram illustrating a binding acknowledge message in which an R field is added according to an embodiment of the present invention.

Referring to FIG. 7, a restoration capability (R) flag 703 is defined in the basic binding acknowledge message defined in FIG. 6 as in the binding update message. FIG. 7 shows that an additional field is included in the binding acknowledge message defined in FIG. 6.

When the R flag 506 of the binding update message received from the MN is set to 1, the CN also defines the R flag 705 to show that the CN has its own address restoration capability. When the R flag 703 is set to 1, the CN has its own address restoration capability and thus the MN uses its care-of address as a source address when the MN sends data to the CN. In addition, the MN does not need to additionally use a home address option of a destination option header for its home address. Moreover, the CN also uses the MN's care-of address as a basic header destination address when the CN sends data to the MN and the CN does not need to additionally use a type 2 routing header for the MN's home address.

Figure 8:
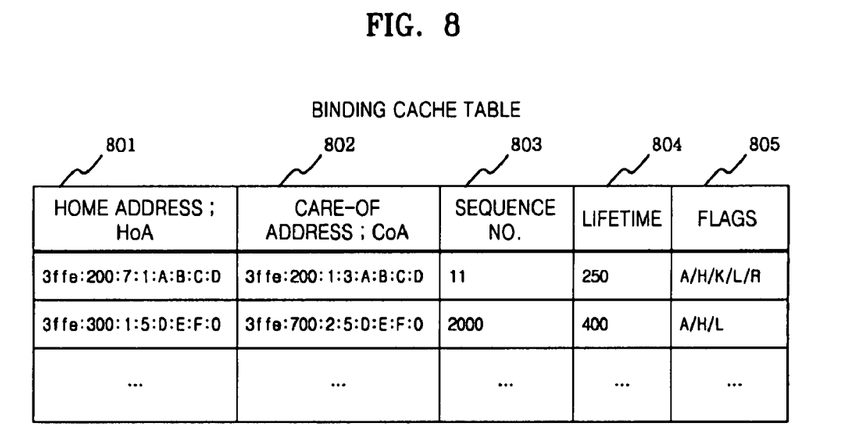
FIG. 8 is a diagram of a binding cache table according to an embodiment of the present invention.

FIG. 8 is a diagram of a binding cache table according to an embodiment of the present invention.

Referring to FIG. 8, the binding cache table includes a home address field 801, a care-of address field 802, a sequence number field 803, a lifetime field 804, and A, H, K, L, and R flags 805 defined in a binding update message and a binding acknowledge message as essential elements.

The binding cache table is established in the CN, and fields existing in each entry of the binding cache table are formed of the fields included in the binding update message and the binding acknowledge message. In particular, according to an address restoration capability of each node, the R flag according to an embodiment of the present invention may or may not be defined in the field provided by a general mobility method of IPv6. In the case of the node in which the method according to an embodiment of the present invention is not used, the R flag is ignored and thus compatibility between a terminal supporting the method provided according to an embodiment of the present invention and a terminal without supporting the method provided according to an embodiment of the present invention is possible.

Figure 9:
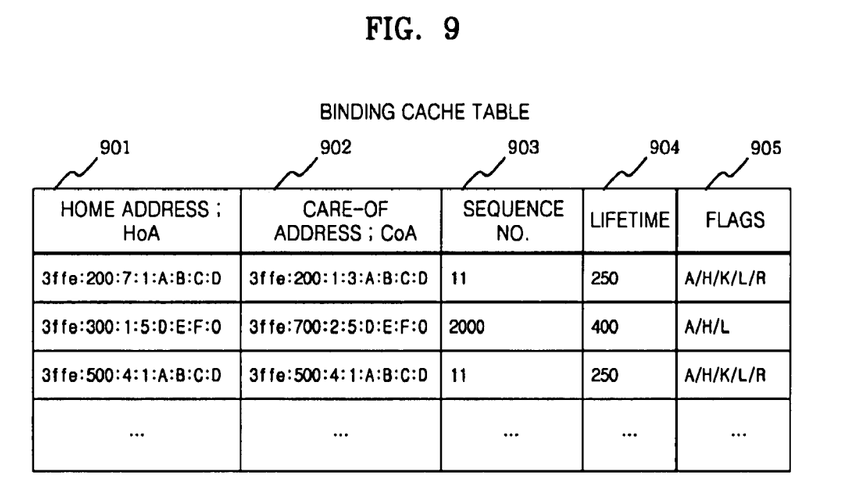
FIG. 9 is a diagram of a binding update list according to an embodiment of the present invention.

FIG. 9 is a diagram of a binding update list according to an embodiment of the present invention.

Referring to FIG. 9, the binding update list (BUL) includes a home address field 901, a care-of address field 902, a sequence number field 903, a lifetime field 904, and A, H, K, L, and R flags 905 defined in a binding update message and a binding acknowledge message as essential elements.

The fields existing in each entry of the BUL are formed of the fields included in the binding update message.

Similar to the binding cache table, the R flag according to an embodiment of the present invention may or may not be defined in the field provided by a general mobility method of IPv6 according to an address restoration capability of each node.

Figure 10A:
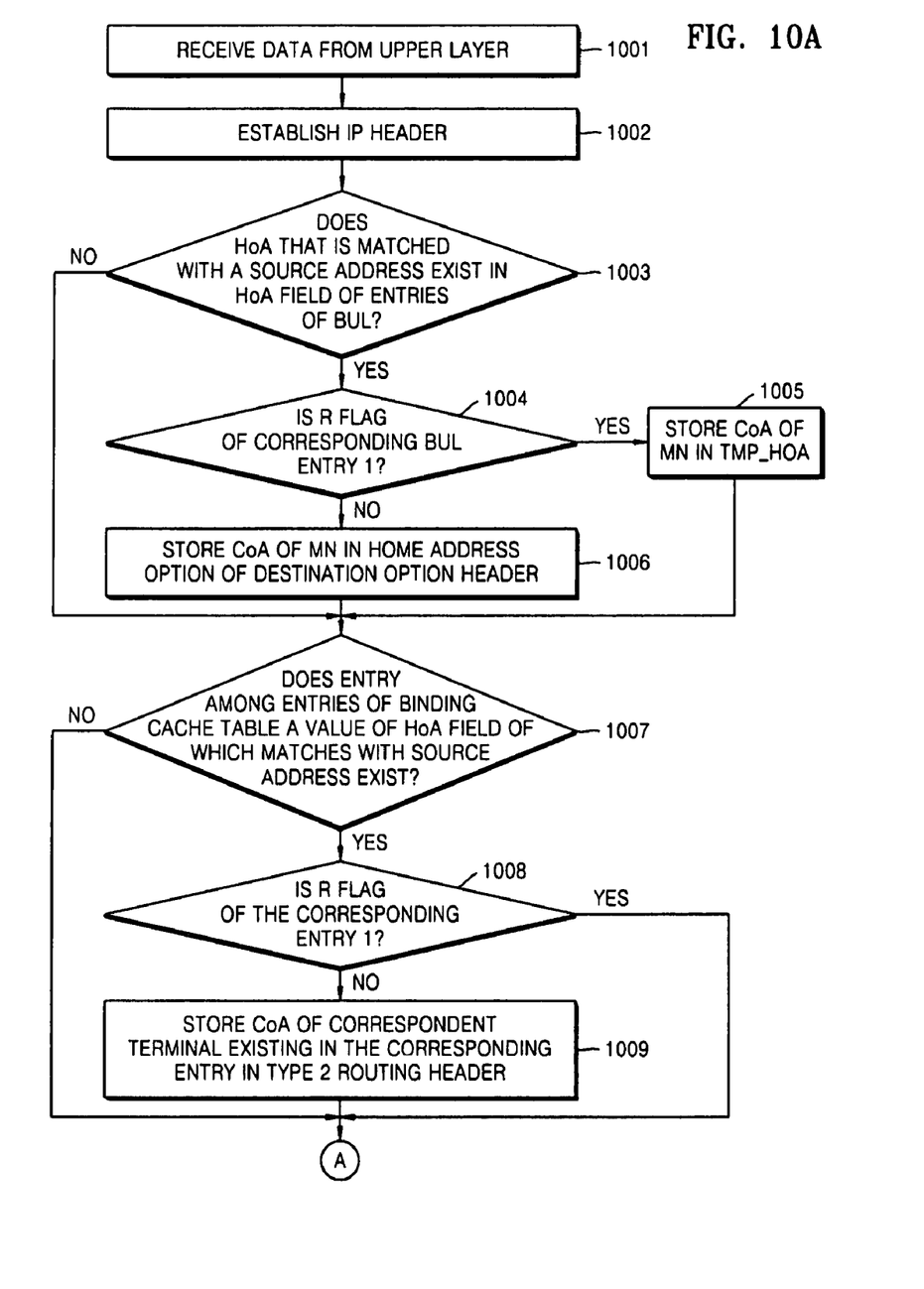
FIG. 10 is a flowchart illustrating a process of sending a packet from a terminal according to an embodiment of the present invention.
Figure 10B:
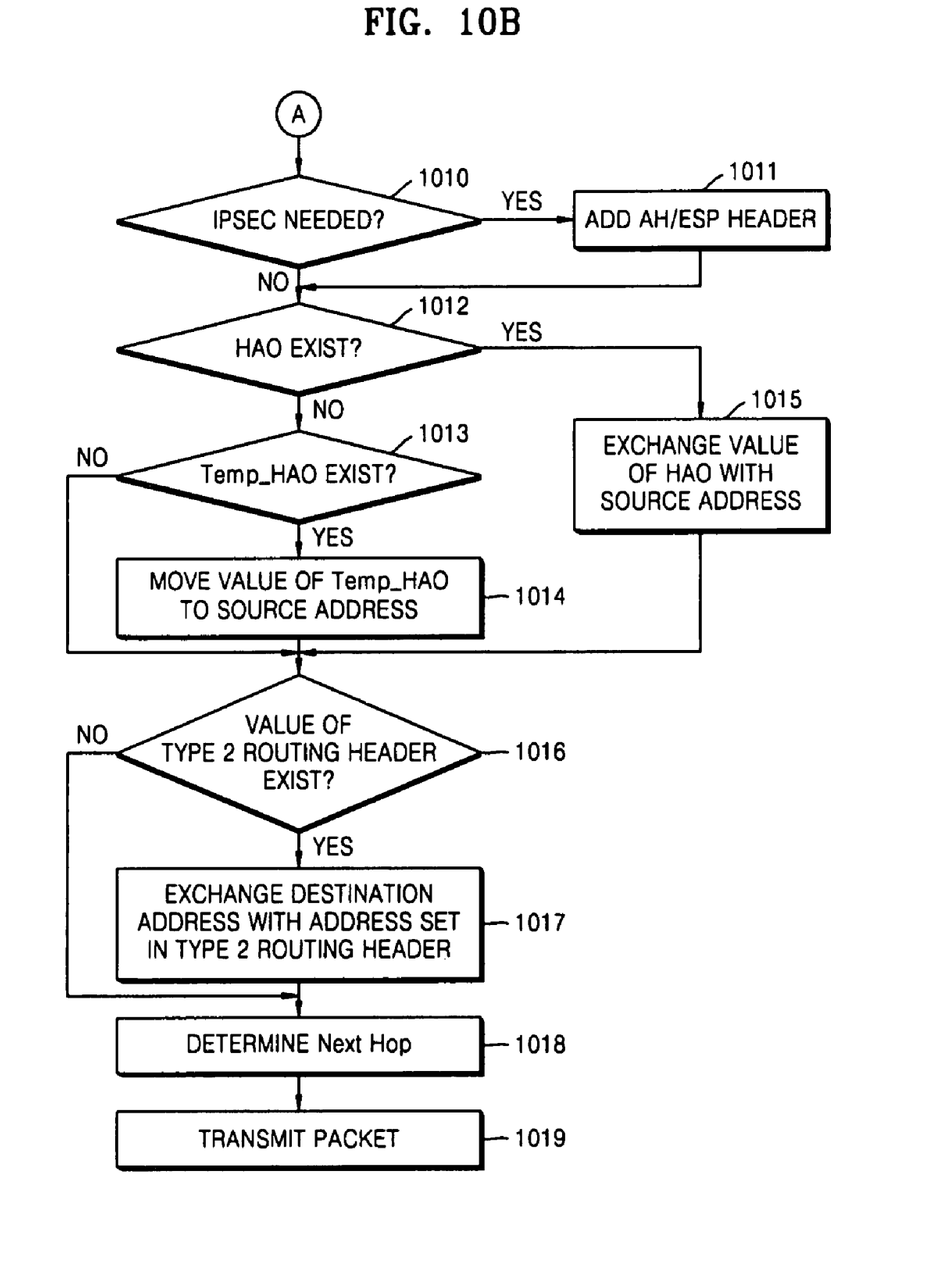

FIG. 10 is a flowchart illustrating a process of sending a packet from a terminal according to an embodiment of the present invention.

Referring to FIG. 10, data is transmitted through an upper layer such as an application program in operation 1001. In operation 1002, based on the transmitted data, a basic IPv6 header is established. In this case, the basic IPv6 header is generated based on home addresses of the terminal which is to send a packet and a correspondent terminal that is to be communicated with the terminal.

In operation 1003, the BUL is searched to identify whether a home address (HoA) set in an entry of the BUL and matched with a source address of the IPv6 header exists in the BUL. If at least one entry of the BUL which has such a home address exists, it means that the terminal moves. If the corresponding entry does not exist, operation 1007 which will be described later is performed.

If the corresponding entry exists, the R flag from among the flags set in the corresponding entry is examined to identify whether the terminal has an address restoration capability in operation 1004. If the R flag is set to 1, a care-of address (CoA) of the terminal is stored in Tmp_HOA such as a temporary variable in operation 1005. If the R flag is set to 0, the CoA of the terminal is stored in a home address option of a destination option header that is IPv6's extended header in operation 1006. In the case of the terminal according to an embodiment of the present invention, if it is assumed that the terminal itself has an address restoration capability, operation 1005 can be directly performed without operation 1004.

Then, it is checked whether an entry among entries of the binding cache table, a value of the HoA field of which matches with a destination address, exists in operation 1007.

If the corresponding entry exists, it means that the correspondent terminal that is to be communicated with moves. If the corresponding entry does not exist, operation 1010, which will be described later, is performed.

When the corresponding entry exists, the R flag from among the flags set in the corresponding entry is examined to identify that the correspondent terminal has an address restoration capability in operation 1008. If the R flag is set to 1, operation 1010 is performed. If the R flag is set to 0, the CoA of the correspondent terminal existing in the corresponding entry of the binding cache table is stored in a type 2 routing header in operation 1009.

In operation 1010, whether an IPsec process should be needed is identified. If the IPsec process is needed, an AH/ESP header is added in operation 1011.

Such a process conforms to RFC 3775 and related standards. If the IPsec is not needed, whether a value of a home address option of a destination option header exists is identified in operation 1012. In operation 1013, if a value does not exist, it is identified whether a value of Temp_HAO which is a sort of a temporary variable exists. If a value of Temp_HAO exists, the value which exists is written on a source address of an IPv6 basic header in operation 1014. If a value of Temp_HAO does not exist, operation 1016 is performed. If a value of a home address option of a destination option header exists in operation 1012, the value is exchanged with a source address of an IPv6 basic header in operation 1015.

Then, in operation 1016, whether a value of a type 2 routing header exists is identified. If a value of a type 2 routing header exists, the value is exchanged with a destination address of an IPv6 basic header. If a value of a type 2 routing header does not exist, operation 1018 is performed.

In operation 1018, an interface that is to be used with reference to routing information according to a current location of the correspondent terminal is determined.

In operation 1019, a packet is transmitted through the interface determined in operation 1018.

Figure 11A:
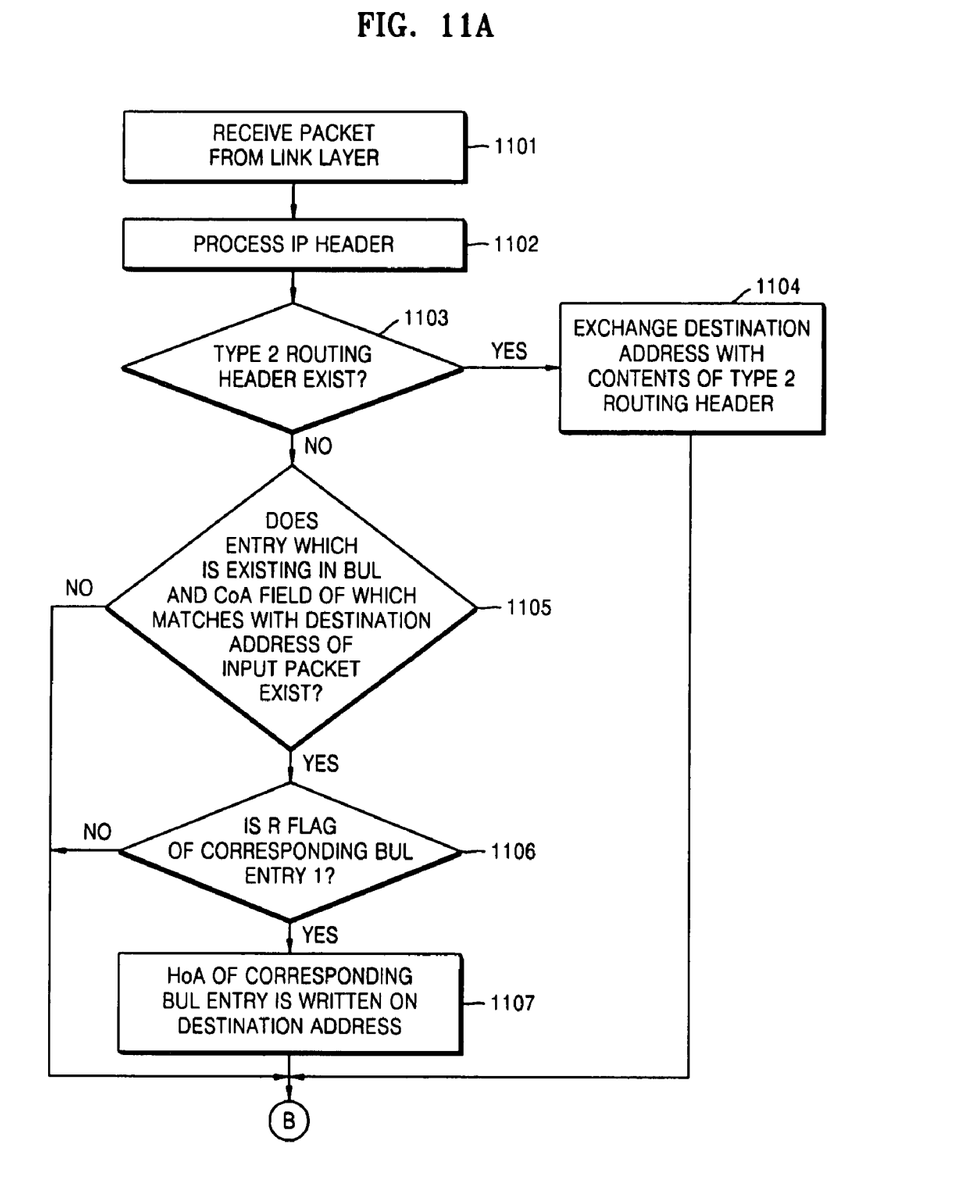
FIG. 11 is a flowchart illustrating a process of receiving a packet in a terminal according to an embodiment of the present invention.
Figure 11B:
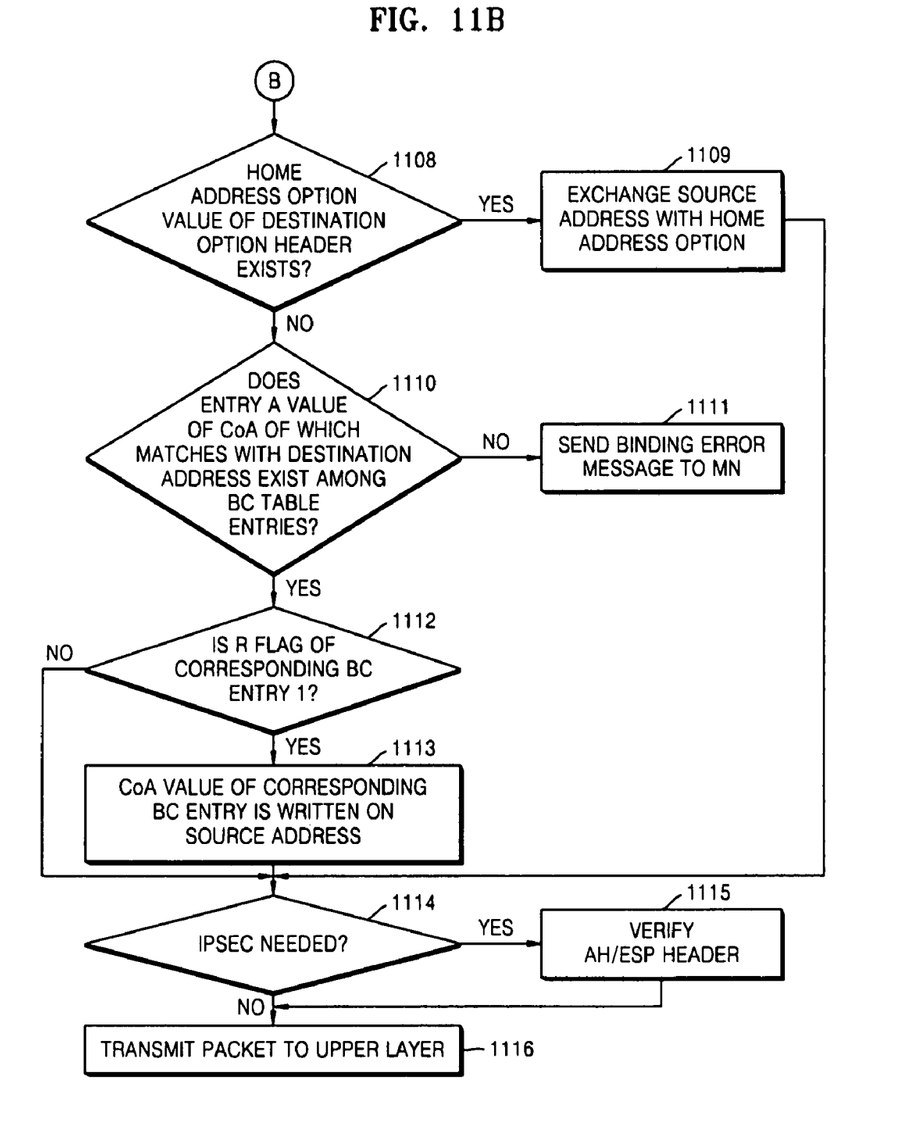

FIG. 11 is a flowchart illustrating a process of receiving a packet in a terminal according to an embodiment of the present invention.

Referring to FIG. 11, a packet is received from a link layer in operation 1101. A basic IP header is processed in operation 1102.

In operation 1103, it is identified whether a type 2 routing header exists. If the type 2 routing header exists, a destination address of an IPv6 basic header is exchanged with contents of the type 2 routing header in operation 1104.

If the type 2 routing header does not exist, it is examined whether an entry of the BUL, a value of the CoA field of which matches a destination address of an IPv6 basic header of the input packet, exists in operation 1105.

When the corresponding entry does not exist, operation 1108 is performed. When the corresponding entry exists, the R flag from among the flags set in the corresponding entry is examined in order to identify whether the terminal has an address restoration capability according to an embodiment of the present invention while communicating with the terminal sending the packet in operation 1106.

If the R flag is not set to 1, operation 1108 is performed. When the R flag is set to 1, a value of the HoA field of the corresponding entry of the BUL is written on a destination address of an IPv6 basic header in operation 1107.

In operation 1108, it is determined whether a home address option value of a destination option header exists.

If the value exists, a source address of an IPv6 basic header is exchanged with the value in operation 1109.

When the value does not exist in operation 1108, it is examined whether an entry of a value of the CoA field of which matches with a source address of an IPv6 address exists among entries of the binding cache table in operation 1110.

If such an entry does not exist, a binding error message is sent to a node sending a packet in operation 1111. If the corresponding entry exists in operation 1110, it is identified whether the R flag is set in the corresponding entry of the binding cache table in operation 1112.

If the R flag is not set, operation 1114 is performed. If the R flag is set, a source address and a HoA value of the corresponding entry is written on a source address of an IPv6 basic header in operation 1113.

In operation 1114, it is identified whether an IPsec process is needed. If the IPsec process is needed, an AH/ESP header is verified in operation 1115. If the IPsec process is not needed, a packet is transmitted to an upper layer in operation 1116.

According to the present invention, use of header information that is added when a terminal is moved is minimized. In addition, since use of an overhead during exchange of data in terminals supporting functions defined in the present invention is minimized, while maintaining compatibility between general terminals that conform to mobile IPv6 and standards of extended methods of the mobile IPv6, bandwidth can be more efficiently used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A communication method for using bandwidth efficiently in Internet Protocol version 6 (IPv6), the method comprising:
   (a) when a mobile node transmits a packet to a correspondent node, sending a binding update message to the correspondent node, the binding update message showing whether a home address option of a destination option header is omitted;
   (b) when the correspondent node that receives the binding update message receives a packet, in which the home address option is omitted, from the mobile node, sending a binding acknowledge message to the mobile node, the binding acknowledge message showing whether a source address of an IPv6 basic header of the packet can be restored as home address of the mobile node;
   (c) changing a source address of a packet that is to be sent by the mobile node into a care-of-address of the mobile node and sending the care-of-address to the correspondent node; and
   (d) the correspondent node which receives the packet restoring the source address of the packet as the home address of the mobile node.

2. The method of claim 1, wherein (a) comprises setting a restoration capability (R) field of a reserved field in the binding update message to show whether the home address option is omitted.

3. The method of claim 1, wherein (b) comprises setting an R field of a reserved field in the binding acknowledge message to show whether the source address can be restored.

4. The method of claim 1, wherein (c) comprises:
   (c1) searching for a binding update message having the same home address with the source address of the packet to be sent from a binding update list of the mobile node;
   (c2) when the searched binding update message displays that the home address option is omitted, changing the source address of the packet to be sent into a care-of-address of the searched binding update message.

5. The method of claim 1, wherein (c) comprises:
   storing the care-of-address of the mobile node in a temporary variable;
   adding an AH/ESP header if IPsec is needed; and
   changing the source address of the packet to be sent into a value of the temporary variable.

6. The method of claim 1, wherein (d) comprises:
   (d1) searching for a binding acknowledge message having the same care-of-address as the source address of the packet received from a binding cache table of the correspondent node; and
   (d2) when the searched binding acknowledge message displays that the source address can be restored, restoring the source address of the received packet as a home address of the searched binding acknowledge message.

7. The method of claim 1, wherein (d) comprises, when the binding acknowledge message having the same care-of-address as the source address of the packet received from a binding cache table of the correspondent node cannot be searched, sending an error message to the mobile node.

8. The method of claim 1, further comprising:
   verifying an AH/ESP header of the packet if IPsec is needed after the correspondent node which receives the packet restores the source address of the packet; and
   if the IPsec is not needed or the AH/ESP is verified, sending the packet to an upper layer.

9. A communication method for using bandwidth efficiently in Internet Protocol version 6 (IPv6), the method comprising:
   (a) when a mobile node receives a packet in which a type 2 routing header is omitted from a correspondent node, sending a binding update message to the correspondent node, the binding update message showing whether a destination address of an IPv6 basic header of the packet can be restored as a home address of the mobile node;
   (b) the correspondent node which receives the binding update message sending a binding acknowledge message to the mobile node, the binding acknowledge message showing whether the routing header type 2 is omitted when the correspondent node sends the packet to the mobile node;
   (c) changing the destination address of a packet to be sent by the correspondent node into a care-of-address of the mobile node and sending the care-of-address to the mobile node; and
   (d) the mobile node which receives the packet restoring the destination address of the packet as the home address of the mobile node.

10. The method of claim 9, wherein (a) comprises setting a restoration capability (R) field of a reserved field in the binding update message to show whether the destination address can be restored.

11. The method of claim 9, wherein (b) comprises setting a restoration capability (R) field of a reserved field in the binding acknowledge message to show whether the type 2 routing header is omitted.

12. The method of claim 9, wherein (c) comprises:
   (c1) searching for a binding acknowledge message having the same home address as the destination address of the packet to be sent from a binding cache table of the correspondent node;
   (c2) when the searched binding acknowledge message displays that the destination address can be restored, changing the destination address of the packet to be sent into a care-of-address of the searched binding acknowledge message.

13. The method of claim 9, wherein (c) comprises:

storing the care-of-address of the mobile node in a temporary variable;

adding an AH/ESP header if IPsec is needed; and changing the destination address of the packet to be sent into a value of the temporary variable.

14. The method of claim 9, wherein (d) comprises:

(d1) searching for a binding update message having the same care-of-address as the destination address of the packet received from a binding update list of the mobile node; and (d2) when the searched binding update message displays that the destination address can be restored, restoring the destination address of the received packet as a home address of the searched binding update message.

15. The method of claim 9, further comprising:

verifying an AH/ESP header of the packet if IPsec is needed after the mobile node which receives the packet restores the destination address of the packet; and if the IPsec is not needed or the AH/ESP is verified, sending the packet to an upper layer.

\* \* \* \* \*